Sept. 21, 1965
D. W. MOYER
3,207,042
FORCE BOOSTER
Filed May 7, 1962
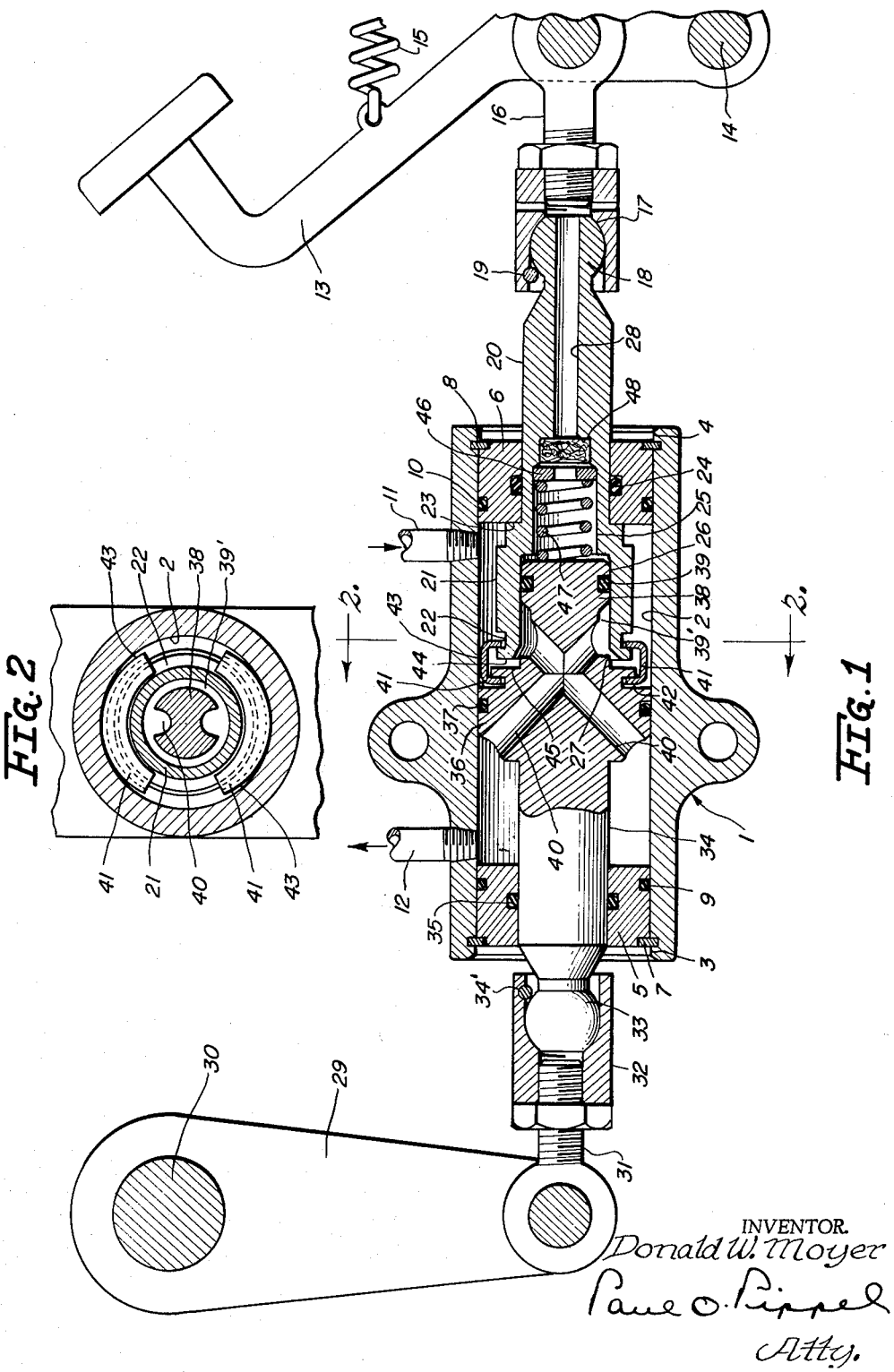
INVENTOR.
Donald W. Moyer
Paul O. Pippel
Atty.

3,207,042
FORCE BOOSTER
Donald W. Moyer, Chicago, Ill., assignor to International Harvester Company, Chicago, Ill., a corporation of New Jersey
Filed May 7, 1962, Ser. No. 192,808
1 Claim. (Cl. 91—49)

This invention relates generally to force boosters, and more particularly to fluid-operated force booster assemblies for use in assisting in the operation of mechanical devices.

In many mechanical systems, such as for example a clutch, the device is operated by means of a pedal or other control which moves in response to an externally applied force and transmits this force through suitable linkage to the operating elements of the device to effect engagement and disengagement of this system.

Such systems are often unduly large and complex due to the necessity of designing them for use in conjunction with large power requirements. Accordingly, they would require large forces for operation were it not for the provision of a booster system.

A primary object of this invention is to provide such a fluid-operated booster system for assisting in the actuation of such mechanical devices.

Another object of this invention is to provide a force booster which will allow for operator feel so as to indicate to the operator the extent of application corresponding to unassisted application.

Another object of this invention is to provide a booster affording smooth operation during the application thereof by providing for limited unassisted application and then gradual increases in the power-assist as application continues.

Another object of this invention is to provide a booster assembly which is reliable in operation and economical in the construction.

Other and additional objects of this invention will be apparent in the following disclosure, in which:

FIGURE 1 is a sectional view of the force booster; and

FIGURE 2 is a sectional view taken along the lines 2—2 of FIGURE 1.

Briefly, the invention provides for an inter-connection between a pedal control and a clutch, for example, resulting in mechanical transmission of forces from the pedal to the clutch upon initial application of force until the resistance to be overcome in the clutch assembly increases to a predetermined value. Continued movement of the pedal control serves to restrict fluid flow through the booster from a pressure inlet to an outlet. This restriction causes a pressure buildup which, in turn, moves a pressure-responsive piston to provide a power-assist to the transmission of forces, thereby overcoming the resistance of the clutch and insuring smooth, continuous operation thereof. The forces resisting movement of the pedal control give a sense of feel to the operator similar to that encountered during strictly mechanical operation. The regulation of flow through the booster causes smooth application of the power-assist.

Referring more in detail to the accompanying drawing, the force booster of the invention is shown by way of example as a clutch booster assembly adapted to be connected between a foot pedal clutch control and a mechanical clutch operator. The booster comprises generally a housing member 1 forming a cylinder 2 having enlarged portions 3 and 4 at the ends thereof. The ends of cylinder 2 are sealed by means of plugs 5 and 6 secured in position with rings 7 and 8 engaged in suitable grooves in plugs 5 and 6 and housing member 1. Suitable fluid seals 9 and 10 are provided between plugs 5 and 6 and cylinder 2 to ensure that leakage from cylinder 2 is prevented.

Fluid inlet line 11 is connected to a suitable source of fluid under pressure (not shown) and communicates through housing 1 with cylinder 2. Similarly, fluid outlet line 12 communicates from cylinder 2 through housing 1 to a suitable low pressure receiver.

Pedal 13 is pivoted at 14 and movable under the influence of externally applied forces against the resistance of biasing spring 15 to move link 16 and socket 17. Ball 18 is engaged in socket 17 and held by means of pin 19. Ball 18 constitutes the end portion of rod 20 extending through plug 6 and terminating in the stepped annular fluid flow control member 21. Member 21 includes the annular externally-facing groove 22 for a purpose to be disclosed later. The shoulder 23 limits movement of rod 20 and member 21 by abutting the inner face of plug 6. Suitable sealing element 24 prevents the loss of fluid between 6 and rod 20. The inner surface of fluid flow control member 21 defines a first annular recess 25 and a second and larger annular recess 26 having at the edge thereof the outturned flange or beveled portion 27. The passage 28 within rod 20 communicates recess 25 with atmosphere through ball 18 and socket 17.

Operating lever 29 is pivoted at 30 to the clutch mechanism. Link 31 extends from lever 29 to engage socket 32. Ball 33 is mounted in socket 32 by means of pin 34' in a manner similar to the mounting of ball 18 in socket 17. Ball 33 constitutes one end of rod 34 which extends through plug 5 into the interior of cylinder 2. Within a recess in plug 5 is located a fluid seal 35 to prevent leakage between rod 34 and plug 5.

Within cylinder 2 and formed on rod 34 is a piston 36 slidable intermediate the inlet and outlet ports 11 and 12. The seal 37 serves to prevent leakage past piston 36 within cylinder 2. Rod 34 protrudes beyond piston 36 in the form of a cylindrical extension 38 cooperating with annular flow control member 21 for a purpose hereinafter to be described. The sealing ring 39 is provided to prevent leakage past cylindrical extension 38 within chamber 26 of annular flow control member 21. An annular recess 39' is formed on extension 38, and from recess 39' through piston 36 to the rod or outlet side thereof extend flow passages 40.

Flow control member 21 and piston 36 are each formed with recesses 22 and 42 respectively which serve to hold U-shaped segmental bands 41, the purpose of which is to limit relative movement between members 21 and 38. Each segmental band 41 has an outside diametral edge 43 smaller than the diameter of cylinder 2 so as to prevent possibility of binding during relative motion between these elements. The edge 44 of element 21 is limited by face 45 of piston 36 in its movement towards piston 36.

Within chamber 25 of member 21 is the backing washer 46 which serves as an abutment for a spring 47, the other end of which abuts the cylindrical extension 38. Spring 47 provides a biasing force for urging member 21 relatively outwardly with respect to extension 38 so as to unblock flow passages 40. Intermediate chamber 25 and passage 28 is located the filter element 48.

Before the application of external forces to pedal control 13 the system may be considered generally to be at rest. In this condition biasing spring 47 urges flow control member 21 away from cylindrical extension 38 to the maximum extent allowed by segmental bands 41. Fluid entering through inlet 11 flows past flange 27, through annular recess 39' and passages 40 to the outlet side of piston 36 and then out through outlet 12.

As force is applied initially to pedal 13, rod 20 is moved to the left as shown in the drawing. At this stage of the operation, resistance in the clutch device has not become great. Therefore, spring 47 serves to transmit force from rod 20 through cylindrical extension 38 and piston 36 to rod 34 which, in turn, moves lever 29 to initiate engagement of the clutch. As this force is applied, resistance to continued actuation of the clutch tends to increase and oppose transmission of force through spring 47. Continued application of external force to pedal 13 then compresses spring 47 and moves rod 20 and its associated flow control member 21 relative to cylindrical extension 38. This relative movement restricts the flow from inlet 11 through the inlet side of cylinder 2 to the annular recess 39' and passages 40. Pressure builds up on the inlet side of cylinder 2 and pressure-responsive piston 36 is forced to the left as shown in the drawing under the influence of this pressure. Movement of piston 36 overcomes the increased resistance in the clutch assembly, thereby continuing its actuation.

Spring 47 remains compressed as external force is continuously applied to pedal 13. It provides the feel necessary to inform the operator of the extent of actuation of the clutch. The beveled flange 27 ensures that restriction of the flow from the inlet through the cylindrical extension and piston to the outlet is smooth, thereby avoiding jerky operation in actuation of the pressure-responsive piston.

It is not essential that flow through passages 40 be totally restricted. The units may operate in effect as a variable orifice, creating a pressure differential between the inlet and outlet sides of cylinder 2 to vary the forces acting upon piston 36 sensitively in response to the application of force to pedal control 13. This also acts to avoid sharp, jerky, erratic action and provides for a smooth operation of the clutch as well as for smooth feel in the operation at the pedal 13.

The capacity of spring 47 should be carefully selected to provide a desired feel for the operator as well as smooth actuation of the fluid-assist for any predetermined force relationship. The chamber 25 in which is positioned spring 47 is vented to atmosphere so as to ensure that any fluid which may leak past seal 39 does not influence the response by building pressure within chamber 25.

Balls 18 and 33 are freely rotatable in sockets 17 and 32, respectively. Thus, any lateral binding of the elements within the housing 1 will create unbalanced forces tending to rotate these elements relatively. The mounting in the ball and socket permits this self-alignment and greatly reduces wear as well as drag on rods 20 and 34. Additionally, this mounting permits the force booster to be anchored in positions where its center line may not be coaxial with the lines of external force.

The areas of rod 20 and cylindrical extension 38 may be of such relative size as to provide for or eliminate hydraulic reaction. Although such reaction may be desirable in some installations, the preferred embodiment of this invention provides for its elimination by designing equal areas subjected to fluid pressure. This insures that no kickback on rod 20 would be felt by the operator in the event that he engages the force booster prior to application of fluid pressure.

It is to be understood that the foregoing description and the accompanying drawing have been given only by way of illustration and example. Various modifications will undoubtedly suggest themselves to those skilled in the art and are considered to be within the scope of the present invention, which is limited only by the claims which follow:

What is claimed is:

For use with a force-operated device offering increased resistance as force applied thereto is increased and a force-transmitting device for operating the force-operated device in response to application of external force, the combination comprising: force booster means interposable between the devices, said force booster means including a housing defining a cylinder, a high pressure fluid inlet and a low pressure fluid outlet communicating with said cylinder, pressure responsive piston means slidable in said cylinder intermediate said inlet and outlet and having a cylindrical extension in the inlet side thereof, the outlet side of said piston means being connectable with the force-operated device, means defining a passage extending from said extension to the outlet side of said piston means for communicating said inlet with said outlet, annular flow control means slidable relative to said extension between a first position restricting flow through said passage and a second position allowing unrestricted flow through said passage, said piston means and flow control means defining recesses therein, a plurality of U-shaped segmental bands in said cylinder engaging said recesses, the outside diametral edge of each segmental band being smaller than the inside diameter of said cylinder, said flow control means being connectable with the force-transmitting device, said flow control means and said extension defining a chamber, and a spring in said chamber interposed between said flow control means and said extension and biasing said flow control means toward said second position, said spring being strong enough to prevent relative sliding upon initial application of external force to the force-transmitting device and weak enough to allow relative sliding as the resistance of the force-operated device increases.

References Cited by the Examiner

UNITED STATES PATENTS

| | | | |
|---|---|---|---|
| 1,890,010 | 12/32 | Vickers | 121—41 |
| 2,331,238 | 10/43 | Schnell | 121—41 |
| 2,517,005 | 8/50 | MacDuff | 121—41 |
| 3,060,899 | 10/62 | May et al. | 91—376 |
| 3,072,106 | 1/63 | Randol | 121—41 |
| 3,081,744 | 3/63 | Brooks et al. | 121—41 |

FRED E. ENGELTHALER, *Primary Examiner.*

KARL J. ALBRECHT, SAMUEL LEVINE, *Examiners.*